(No Model.)
S. GARWOOD.
VEHICLE.
No. 491,544. Patented Feb. 14, 1893.
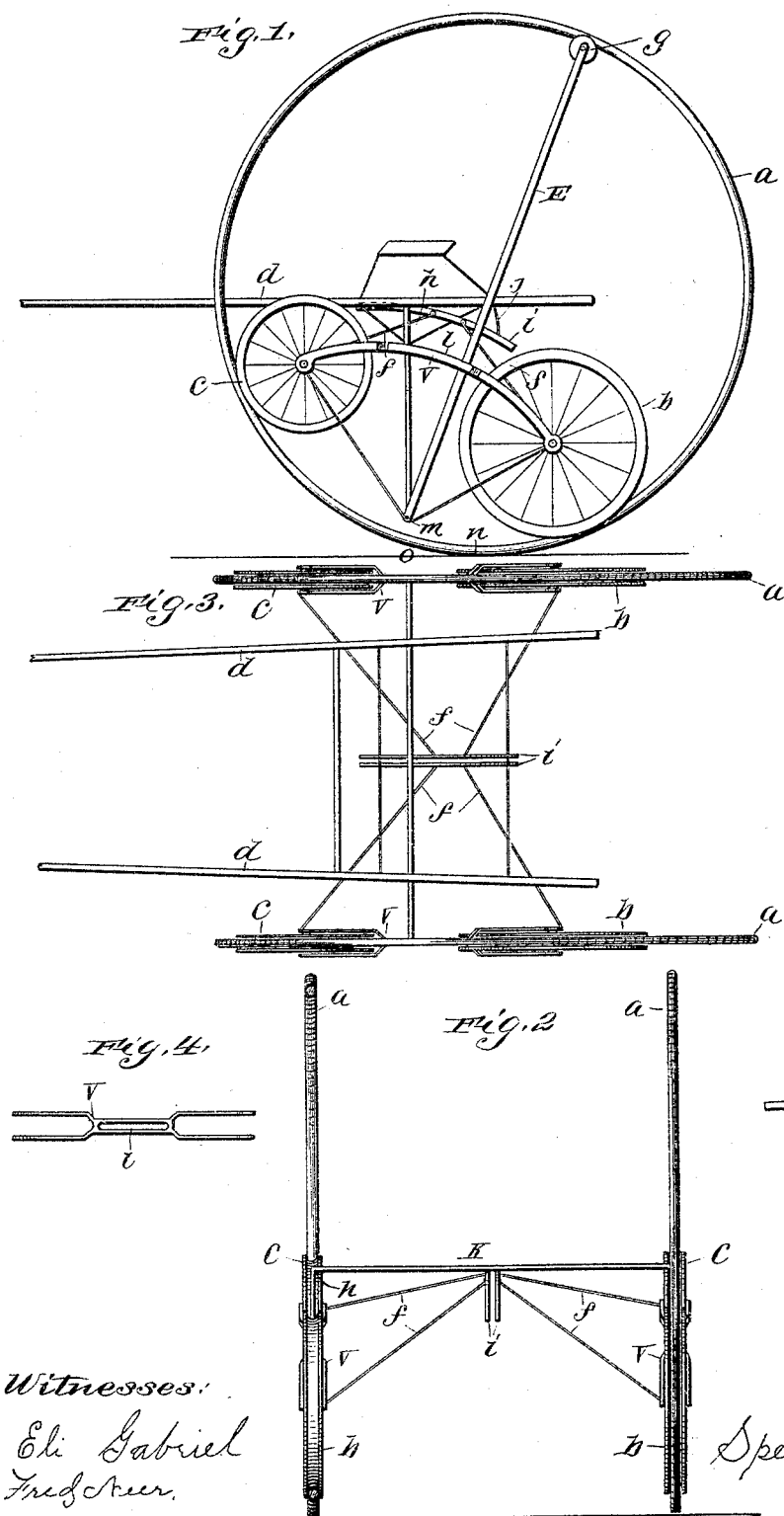
Witnesses:
Eli Gabriel
Fred Keer.
Inventor:
Spencer Garwood

UNITED STATES PATENT OFFICE.

SPENCER GARWOOD, OF MILFORD CENTER, OHIO.

VEHICLE.

SPECIFICATION forming part of Letters Patent No. 491,544, dated February 14, 1893.

Application filed December 5, 1891. Serial No. 414,200. (No model.)

*To all whom it may concern:*

Be it known that I, SPENCER GARWOOD, a resident of Milford Centre, in the county of Union and State of Ohio, have invented a certain new and useful Improvement in Vehicles, of which the following is a specification.

My invention relates to improvements in that class of vehicles where bearing wheels run within large ground rims and particularly to the further improvement of my former patents Nos. 418,611, 441,151, and application Serial No. 347,853.

The object of this my improvement is the better aid of the draft per gravitation in the providing of two flanged unequal diameter bearing wheels to run within each large ground rim, with the smaller wheel in front and the center of gravity of the vehicle frame axle and rider secured midway between the bearing wheels by the means of a portable yoke as hereinafter described and all connected in combination with a vehicle frame and axle. I attain these objects by the mechanical illustrations in the accompanying drawings in which Figure 1 is a side elevated view of entire vehicle without the coiled spring and cord to cross bar as shown in my former drawing which also have described in my former patent No. 441,151. Fig. 2 posterior view of vehicle without side bars seat and vehicle frame with left rim half sectional. Fig. 3 vertical view without seat or side bars. Fig. 4 is a vertical view of the upper half of the portable yoke, showing the long slot through which the axle descends at right angles and plays back and forth with the motion of shafts and bearing wheels upon the rim. Fig. 5 is the curved slide free from any attachment.

Similar letters refer to similar parts throughout the several views.

*a* represents the large ground rims.
*b* represents the rear bearing wheels.
C represents the front bearing wheels.
*d* represents the shafts.
E represents the cross or diameter bars.
*f* represents the stay rods from the ends of the portable yoke to curved slide under the axle and middle of vehicle.
*g* represents the guide wheels at the top of the diameter bar.
*h* represents the axle at its descending portion.
*i* is the curved slide.
*j* represents the braces which the curved slide glides through their slots.
K represents the braces from vehicle frame to the axle. *l* the upper part of the portable yoke at the point of the long slot for the axle.
M represents the pivotal end of the axle to the lower half of the portable yoke and the bolted end of the diameter bar.
N represents the point of the center of gravity of the rim with the ground. O the point of the center of gravity reached at the pivotal end of the axle.

The large ground rim *a* receives within it the two unequal diameter bearing wheels with the smaller C. in front, which is connected to the rear wheel *b*. by the portable yoke V through which the axle of the vehicle passes downward at a right angle through a long slot *t* in the upper half of the yoke and is pivotally connected with the axle at the middle of the lower half of the yoke at M. The vehicle frame being rigidly secured to the axle, the weight of the vehicle frame rider and axle will necessarily be received at the pivotal end of the axle at M, midway between the two unequal diameter bearing wheels upon the same rim, the rear bearing wheel *b*. being the larger wheel will have a greater leverage power downward upon the same rim than the smaller one with each being equal distance from the center of gravity of the rim at *n*. the leverage downward of the rear wheel being greater. the point midway between the bearing wheels the gravity of vehicle frame axle and rider, at the pivotal end of the axle will naturally gravitate to the point O beyond the center of gravity of the rim with the ground at *n*. hence exercising a gravity leverage power upon the large ground rim equal to the distance gained from the point at O beyond the point at *n*. The vehicle frame being similarly rigid and connected as in my patent No. 441,151 an effect by the draft of the horse will be obtained by the advance of the bearing wheels upon the rim and in similar manner the weight of the same frame axle and rider will exercise the same with additional leverage upon the rim as gained by the natural gravitation, making the weight act as a two fold assistance in the propelling aid first by the natural gravitation and second by the draft of the horse, as described. The axle being rigidly fixed to the vehicle frame the descending portion at $h$ remains perpendicular, while the draft is made upon the shafts the yoke which is secured to the bearing wheels by the ordinary axis between its forks, rotates with the curve of the rim, allowing the axle at $h$ to pass back and forth through and along the long slot $l$. The curved slide $i$ being rigidly secured to the yoke by means of the brace rods $f$, slide back and forth simultaneously with the yoke through the slotted braces $j$ all in combination keep the yokes bearing wheels and rims in a direct line with the vehicle frame and shafts, as described. The axle passing down at right angles through the upper portion of the portable yoke and pivotally connected to the middle of the lower half of the portable yoke the diameter bar E bolted to the upper and lower middle of the same and guide wheels at the top with the flanges of the bearing wheels at the bottom the rim is thereby kept in an upright position and in line and direction with the draft and vehicle frame.

I am aware that two bearing wheels fixed by straight connection within a large ground wheel or rim have been used before and prior to my invention, but never with bearing wheels of unequal diameters, and never before with a portable yoke as herein described and for the purpose set forth and What I do claim as my invention and desire to secure by Letters Patent is The two unequal diameter bearing wheels using the smaller in front to rim connected by a portable yoke within a large ground rim in combination with a vehicle axle and frame the axle passing at right angles down through a long slot of the upper part of the portable yoke and pivotally connected at the bottom of said yoke and said yoke connected by stay rods to a curved slide secured beneath the middle of the vehicle axle and frame said slide stayed by slotted braces with diameter bars bolted to middle of upper and lower half of said yoke with guide wheels at the top substantially as described and for the purpose set forth.

SPENCER GARWOOD.

In presence of—
WILLIAM REED,
W. H. SIDEBOTTOM.